June 5, 1928.
C. T. PATTERSON ET AL
1,672,774
EGG TRAY
Filed Aug. 11, 1927
3 Sheets-Sheet 2
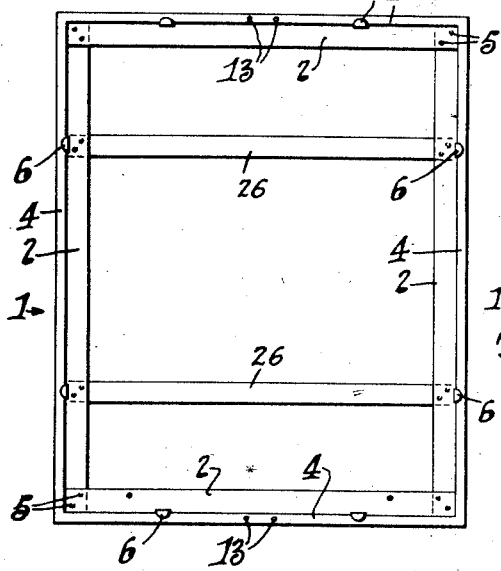
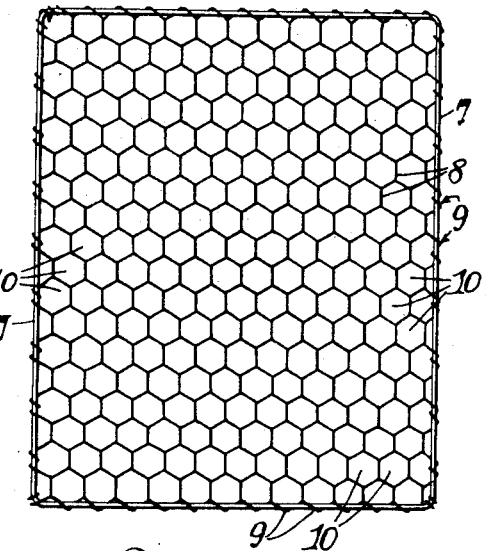
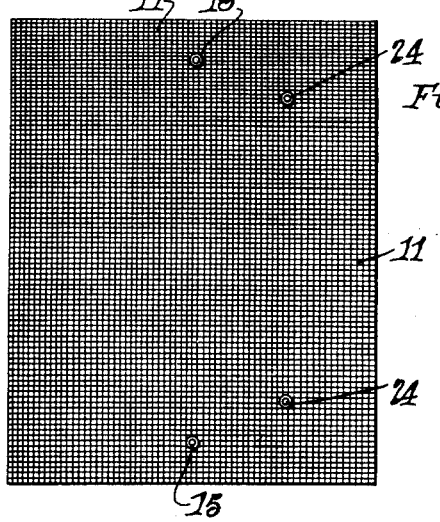
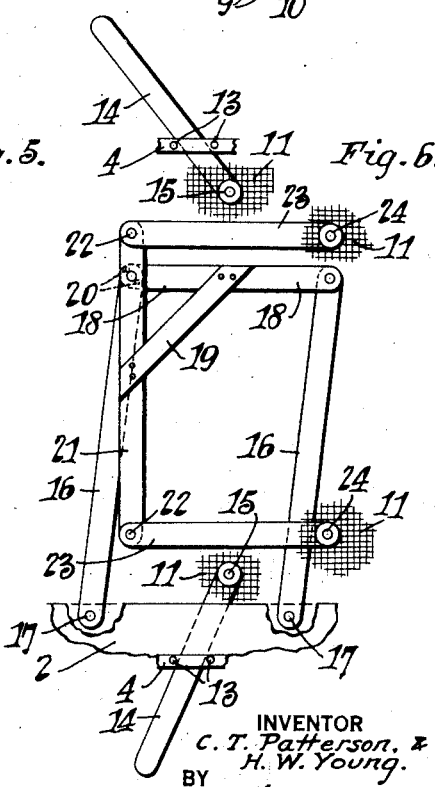
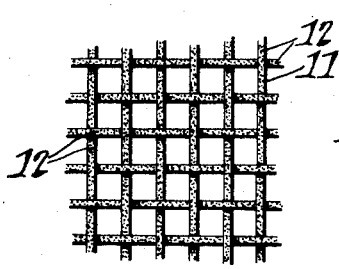
INVENTOR
C. T. Patterson &
H. W. Young.
BY
ATTORNEY June 5, 1928.
C. T. PATTERSON ET AL
1,672,774
EGG TRAY
Filed Aug. 11, 1927
3 Sheets-Sheet 3
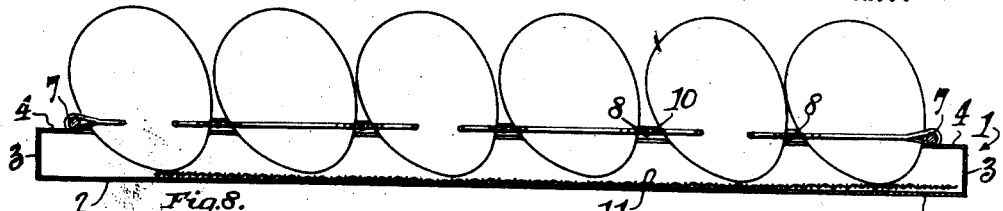
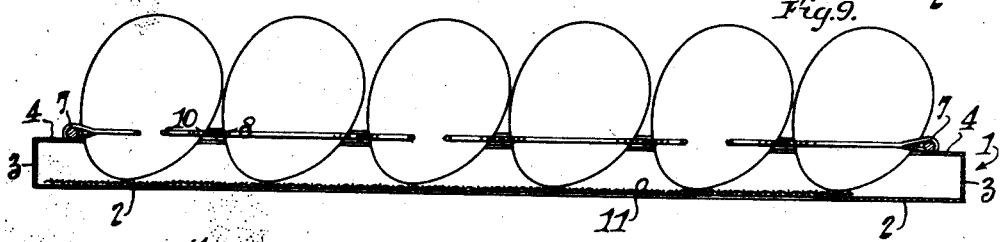
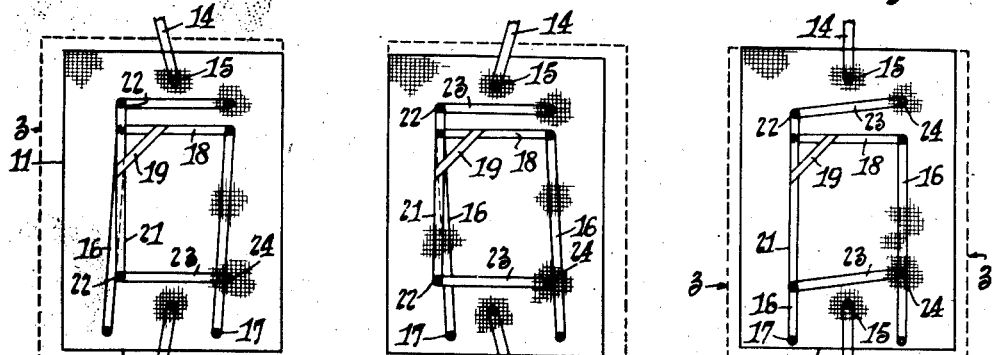
Fig.10.  Fig.11.  Fig.12.
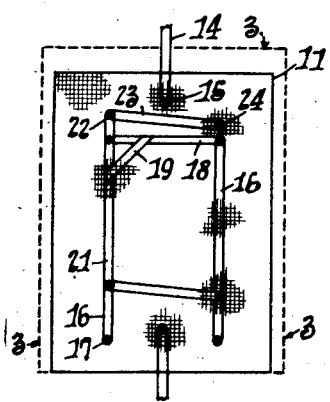 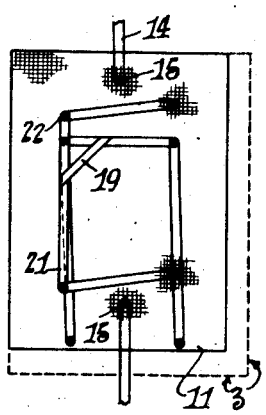 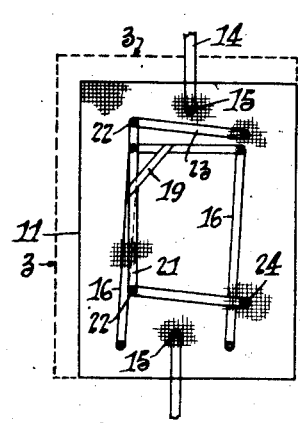
Fig.13.  Fig.14.  Fig.15.
INVENTOR
C. T. Patterson, &
H. W. Young.
BY
ATTORNEY Patented June 5, 1928.

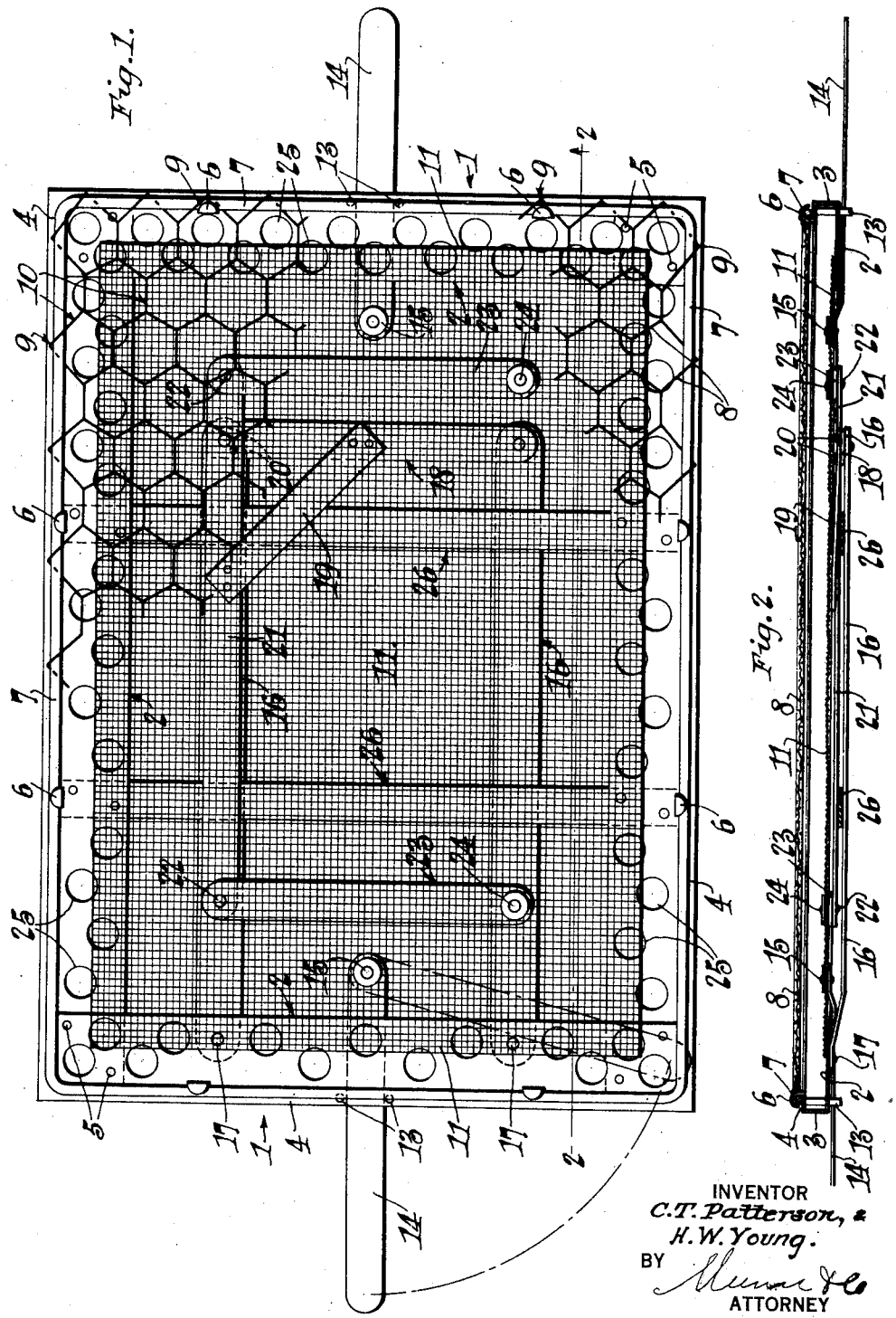

1,672,774

UNITED STATES PATENT OFFICE.

CHARLEY T. PATTERSON AND HOMER W. YOUNG, OF SPRINGFIELD, MISSOURI.

EGG TRAY.

Application filed August 11, 1927. Serial No. 212,310.

The invention primarily has for its object to provide a simple, compact and efficiently operable, egg tray construction for use in incubators and by the employment of which it is possible to properly turn the eggs, and in addition, hold the eggs in correct position at all times.

It is well known that eggs should be turned during incubation to prevent adhesions, give exercise to the embryo and promote symmetrical development of the embryo. Also, that the eggs should be maintained in a certain position while at rest in order to correctly fix the chick's position in the eggs ready to hatch.

Adhesions caused by incorrect turning, and misplacements caused by incorrect positioning of the eggs cause many embryo chicks to die in the shell. In order to bring about correct results the eggs should be turned onto all sides and should be maintained in position with their large or air-cell ends highest when at rest. It is therefore important that means should be provided for turning each egg on to any side and for assuring the holding of the eggs always in the correct position while at rest.

Therefore, in its more detailed nature, the invention seeks to provide a tray embodying a universally shiftable medium to effect movement or turning of the eggs, and a stationary individual egg holding and positioning medium to hold the eggs while being moved and positioning them while at rest and by the co-operation of which mediums it is possible to move or turn the eggs onto all sides and through all planes and also to maintain a certain angle or position of the eggs when at rest.

With the above and other objects in view that will hereinafter appear, the invention further resides in the novel details of construction, combination and arrangement of parts, all of which will be first fully described in the following detailed description, then be particularly pointed out in the appended claims, reference being had to the accompanying drawings in which:—

Figure 1 is a plan view of the invention, parts being broken away,

Figure 2 is a vertical longitudinal section taken on the line 2—2 of Fig. 1,

Figure 3 is a plan view of the tray body frame per se,

Figure 4 is a plan view of the holding screen per se,

Figure 5 is a plan view of the shiftable screen sheet per se,

Figure 6 is a plan view of the shifting levers, fragments of the tray body frame and the shiftable screen sheet also being shown, Figure 7 is an enlarged plan view of a fragment of the shiftable screen sheet, Figures 8 and 9 are diagrammatic vertical cross sections generally indicating extreme movements of the eggs through a single plane.

Figures 10, 11, 12, 13, 14 and 15 are diagrammatic plan views illustrating various movements of the shifting screen sheet, and the positions of the levers in accomplishing such movements.

In the practical development of the invention, we provide a tray body frame 1 comprising an open bottomed rectangle and shaped to provide supporting base flanges 2, upstanding confining or abutment walls 3 and overhanging edges 4.

The frame is preferably formed of four pieces of thin sheet metal bent to the shape shown and described and lapped and secured at the corners by rivets 5.

The edges 4 include retaining lips 6 adapted to hook over and retain the wire frame 7 in position upon the edges as shown in Figs. 1 and 2, this arrangement permitting the removal of the positioning member 7, 8 and 9 just before the chicks are ready to hatch allowing the eggs to remain free upon the screen sheet 11.

As will be observed by reference to Fig. 4, the frame 7 carries the holding and positioning screen 8 which may be constructed of wire woven to form hexagonal openings secured upon the frame by threading or wrapping at the edges as at 9 and providing individual egg cells or pockets 10 to receive the central portion of the eggs and hold them in the proper position at all times.

A shiftable screen sheet 11, preferably constructed of fine mesh wire, is slidably carried or supported on the base flanges 2 as indicated in Figures 2, 8 and 9, and is universally shiftable on its support through the use of shifting mechanism later to be described.

The screen sheet 11 is adapted to receive and support the small ends of the eggs and when it moves the said egg ends move with it. To assure positive action of this screen in thus moving the egg ends, it may be sand coated as at 12, the sand being applied with waterproof cement.

A pair of guide and fulcrum lugs 13 depend from each body frame end and through each such pair of lugs an operating lever 14 works, the inwardly projected end of each of which is pivoted at 15 to the screen sheet 11.

Parallel levers 16 are pivoted at 17 to the base flange 2 at one end of the body frame and have their free ends pivotally joined by a link 18 which is braced at 19 and riveted at 20 to the link 21. The link 21 is pivoted at its ends to the free ends of the parallel levers 23 which are pivoted at 24 to the screen sheet 11.

By reason of the rivet and brace connections 19 and 20 the links 18 and 21 must always remain in right angled relation, and because of this fact and the cooperation of the two pairs of parallel levers which the links connect, a compound lever system is provided by which the screen sheet 11 is caused to move universally in a horizontal plane upon the supporting flanges 2 in any direction in a horizontal plane but always parallel with the adjacent abutment walls 3. This movement of the levers and screen is effected through manipulation of either of the levers 14 in the manner clearly illustrated in Figs. 10 to 15 inclusive. Levers 14 are provided at both ends of the tray so that the tray can be reversed in the incubator and yet have one lever accessible while the other is swung under the screen 11.

If desired the base flanges 2 may be perforated at 25 to provide for ventilation and to lessen the weight of the tray body frame.

Cross slats 26 are secured across the body frame at intervals from base flange to base flange and serve to strengthen the body frame and to support and guide the levers 16 and the link 21, the former passing beneath the said slats and the latter passing above them. See Figs. 1 and 2.

In the employment of the structure herein disclosed it is possible always to hold the eggs with their major axes on the proper angle regardless of the shifted positions of the smaller or supported egg ends, also to move or turn the eggs through any and all planes and onto all sides and hold the egg in the proper position while at rest.

We claim:—

1. In egg trays of the character described, a movable egg supporting bottom, a stationary individual egg holding and positioning member above the said bottom and means to move said bottom in any horizontal direction.

2. In egg trays of the character described, a movable egg supporting bottom, a stationary individual egg holding and positioning member above the said bottom, and means to move said bottom in any horizontal direction, said holding member having cells to receive the central portion of the eggs to properly position them at all times.

3. In egg trays of the character described, a movable egg supporting bottom, a stationary individual egg holding and positioning member above the said bottom, and means to move said bottom in all directions in a horizontal plane.

4. In egg trays of the character described, a rectangular movable egg supporting bottom, a stationary individual egg holding and positioning member above the said bottom, said egg holding and positioning member being removably attached to a frame which supports the movable bottom and the holding member in cooperative relation and including confining abutment walls forming a rectangle and means to move said bottom in all directions in the horizontal plane, but always with the edges of the bottom in parallelism with the adjacent abutment walls which form a confining and guiding member for the said movable bottom.

5. In egg trays of the character described a movable egg supporting bottom, a stationary individual egg holding and positioning member above the said bottom and means to move said bottom in all directions in a horizontal plane, so that imaginary lines drawn through the said bottom in any direction will be always parallel regardless of what position the said bottom is shifted to.

6. In egg trays of the character described a rectangular movable egg supporting bottom, a detachable stationary individual egg holding and positioning member above the said bottom, a frame to support the movable bottom and the holding member in cooperative relation and including confining and guiding abutment walls forming a rectangle, and means to move said bottom in all directions in the horizontal plane, said moving means including operating levers connected at one end to the movable bottom and having their free ends projected beyond the frame.

7. In egg trays of the character described a rectangular movable egg supporting bottom, a detachable stationary individual egg holding and positioning member above the said bottom, a frame to support the movable bottom and the holding member in cooperative relation and including confining and guiding abutment walls forming a rectangle, and means to move said bottom in all directions, in the horizontal plane, said moving means including operating levers pivoted at one end to the movable bottom and having their free ends projected beyond the frame, and fulcrum lugs carried by the frame and engaged by said operating levers.

8. In egg trays of the character described, a rectangular movable egg supporting bottom, a detachable stationary individual egg holding and positioning member above the said bottom, a frame to support the movable bottom and the holding member in cooperative relation and including confining and guiding abutment walls forming a rectangle, and means to move said bottom in all directions in the horizontal plane, but always with the edges of the bottom in parallelism with the adjacent abutment walls, said moving means comprising operating levers pivoted at one end to the movable bottom and having their free ends projected beyond the frame, fulcrum lugs carried by the frame and engaged by said operating levers, and compound parallel lever and link connections pivoted to the frame and to the movable bottom.

9. In egg trays of the character described, a rectangular movable egg supporting bottom, a detachable stationary individual egg holding and positioning member above the said bottom, a frame to support the movable bottom and the holding member in cooperative relation and including confining and guiding abutment walls forming a rectangle, and means to move said bottom in all directions in the horizontal plane, but always with the edges of the bottom in parallelism with the adjacent abutment walls, said moving means comprising operating levers pivoted at one end to the movable bottom and having their free ends projected beyond the frame, fulcrum lugs carried by the frame and engaged by said operating levers, and a compound parallel lever and link connections pivoted to the frame and to the movable bottom, certain of said lever and link connections being brace and rivet secured together in fixed relation.

10. In egg trays of the character described a rectangular movable egg supporting bottom sheet, a detachable stationary cellular individual egg holding and positioning screen, an open wire frame to carry said holding screen, a rectangular body frame including base flanges to support the bottom sheet, upstanding abutment walls, inturned edges forming a rest flange to receive the wire frame and position it properly above the bottom sheet, and retaining lugs to detachably secure the wire frame in position, and means to move said bottom sheet in all directions in a horizontal plane.

11. In egg trays of the character described, a rectangular movable egg supporting bottom sheet, a detachable stationary cellular individual egg holding and positioning screen, an open wire frame to carry said holding screen, a rectangular body frame including base flanges to support the bottom sheet, upstanding abutment walls, inturned edges forming a rest flange to receive the wire frame and position it properly above the bottom sheet, and retaining lugs to detachably secure the wire frame in position, and means to move said bottom sheet in all directions in a horizontal plane, but always with the edges of the bottom sheet in parallelism with the adjacent abutment walls.

12. In egg trays of the character described, a rectangular movable egg supporting bottom sheet a detachable stationary cellular individual egg supporting and positioning screen, an open wire frame to carry said egg supporting screen, a rectangular body frame including base flanges to support the bottom sheet, upstanding abutment walls, inturned edges forming a rest flange to receive the wire frame and position it properly above the bottom sheet, and retaining lugs to detachably secure the wire frame in position, and means to move said bottom sheet in all directions in a horizontal plane, but always with the edges of the bottom sheet in parallelism with the adjacent abutment walls, said moving means including operating levers pivoted at one end to the movable bottom and having their free ends projected beyond the body frame, and fulcrum lugs carried by the body frame and engaged by said operating levers.

13. In egg trays of the character described, a rectangular movable egg supporting bottom sheet a detachable stationary cellular individual egg holding and positioning screen, an open wire frame to carry said holding screen, a rectangular body frame including base flanges to support the bottom sheet, upstanding abutment walls, inturned edges forming a rest flange to receive the wire frame and position it properly above the bottom sheet, and retaining lugs to detachably secure the wire frame in position, and means to move said bottom sheet in all directions in a horizontal plane, but always with the edges of the bottom sheet in parallelism with the adjacent abutment walls, said moving means comprising operating levers pivoted at one end to the movable bottom and having their free ends projected beyond the body frame, and fulcrum lugs carried by the body frame and engaged by said operating levers, and compound parallel lever and link connections pivoted to the body frame and to the bottom sheet, certain of said lever and link connections being brace and rivet secured together in fixed relation.

14. In egg trays of the character described, a rectangular movable egg supporting bottom sheet a detachable stationary cellular individual egg holding and positioning screen, an open wire frame to carry said holding screen, a rectangular body frame including base flanges to support the bottom sheet, upstanding abutment walls, inturned edges forming a rest flange to receive the wire frame and position it properly above the bottom sheet, and retaining lugs to detachably secure the wire frame in position, and means to move said bottom sheet in parallelism with the adjacent abutment walls, said moving means comprising operating levers pivoted at one end to the movable bottom and having their free ends projecting beyond the body frame and engaged by fulcrum lugs extending downward from and carried by the body frame, and compound parallel lever and link connections pivoted to the body frame and to the bottom sheet, certain of said lever and link connections being brace and rivet secured together in fixed relation, and cross slats connected across from base flange to base flange at intervals and extending over some levers and under other levers and links to strengthen the body frame and assist in guiding and supporting the said compound levers and links.

15. In egg trays of the character described, a rectangular movable egg supporting bottom sheet composed of sand coated material, a detachable stationary cellular individual egg holding and positioning screen, an open wire frame to carry said holding screen, a rectangular body frame including base flanges to support the bottom sheet, upstanding abutment walls, inturned upper edges forming a rest flange to receive the wire frame and position it properly above the bottom sheet, and retaining lugs to detachably secure the wire frame in position; and means to move said bottom sheet in all directions in a horizontal plane, said base flanges being perforated to facilitate ventilation of the tray.

16. In an incubator tray, a cellular egg receiving frame, and a reticulated bottom with which the eggs contact shiftable longitudinally or transversely in the frame whereby to move the eggs.

CHARLEY T. PATTERSON.
HOMER W. YOUNG.